United States Patent
Ostwald

[11] 3,814,546
[45] June 4, 1974

[54] SEAL ASSEMBLY FOR AIR COMPRESSOR VALVE

[75] Inventor: Richard Ostwald, Bowling Green, Ky.

[73] Assignee: Gordon Smith & Co., Inc., Bowling Green, Ky.

[22] Filed: May 24, 1972

[21] Appl. No.: 256,604

[52] U.S. Cl. .............................................. 417/298
[51] Int. Cl. ............................................ F04b 49/00
[58] Field of Search ...... 137/512.3, 512.7; 277/227, 277/231, 235 R, 58, 180; 417/298, 564, 298

[56] References Cited
UNITED STATES PATENTS

| | | | |
|---|---|---|---|
| 864,419 | 8/1907 | Grey | 277/231 |
| 2,014,480 | 9/1935 | Martin | 277/58 |
| 2,520,089 | 8/1950 | Lippincott | 277/227 X |
| 2,957,620 | 10/1960 | Turnwald | 417/564 X |
| 3,083,023 | 3/1963 | Creavey | 277/180 |
| 3,132,870 | 5/1964 | Pschera | 277/235 X |
| 3,292,848 | 12/1966 | Kehler | 417/564 X |
| 3,403,847 | 10/1968 | Parker | 417/564 X |
| 3,689,199 | 9/1972 | Bassinger | 417/564 X |
| 3,692,434 | 9/1972 | Schnear | 417/273 X |

FOREIGN PATENTS OR APPLICATIONS

| | | | |
|---|---|---|---|
| 372,432 | 5/1932 | Great Britain | 277/227 |
| 446,700 | 5/1936 | Great Britain | 277/231 |

Primary Examiner—William L. Freeh
Assistant Examiner—G. P. LaPointe
Attorney, Agent, or Firm—Browne, Beveridge, Degrandi & Kline

[57] ABSTRACT

For air compressor valves, a seal assembly including a first seal ring between the valve body and a seat in the compressor head, a second seal ring concentrically positioned inwardly of the first seal ring and on the upper side of the valve body to which it is secured by a valve cage mounted in a passage in the compressor head. The second seal ring is constructed to have a greater range of deformation or compression such that when the first seal is fully secured by movement of the valve cage into the compressor head, the second seal will not be compressed to its limit but will also sealingly engage the valve body without deforming or distorting the latter. The assembly includes a third seal which may be a conventional O ring positioned about the valve cage in sealing engagement with the compressor head. Preferably, the first and second seal rings are made from a combination of metallic and asbestos materials; the first seal ring being an annular copper ring having a U-shaped cross section with an annular ring of asbestos secured in the channel of the copper ring, and the second seal ring including alternating spiral rings of stainless steel and asbestos having a serrated or serpentine cross section.

8 Claims, 2 Drawing Figures

PATENTED JUN 4 1974  3,814,546

SEAL ASSEMBLY FOR AIR COMPRESSOR VALVE

BACKGROUND OF INVENTION

In many instances conventional and prior art seals for air compressor valves suffer from the drawback that they distort the valve body due to the forces required to establish proper sealing contact. Distortion of the valve body can, of course, prevent proper functioning of the compressor valves. Conventional and prior art seals have also lacked sufficient quality to resist excessive pressures and temperatures encountered in air compressors, the result being disruption or dislodgement of the seal.

OBJECTS OF THE PRESENT INVENTION

It is an object of the present invention to provide a novel seal assembly for air compressor valves which will overcome the above-noted problems attendant prior art or conventional seal assemblies. More specifically, it is an object to provide such a novel seal assembly having improved sealing characteristics and which may be installed with control so as to establish proper and sufficient sealing contact between the valve body, compressor head, and an associated valve cage without distorting the valve body.

It is a further object of the present invention to provide such a sealing assembly which may be easily installed in an air compressor head to effectively seal the air passages to and from the compression chambers of the compressor and which seal assembly moreover will successfully function notwithstanding excessive temperatures and pressures encountered during operation of the compressor.

A further object of the present invention is to provide such a sealing assembly including multiple seals which may be simultaneously installed quickly and easily but with control so as to avoid damage to the seals and associated valves.

A still further object of the present invention is the provision of such a sealing assembly which may incorporate conventional seals per se and be applied to conventional air compressors without requiring modification of the latter.

SUMMARY OF INVENTION

The above and other objects are achieved by three annular seal rings in connection with an air compressor of the type which typically includes a compressor head and block assembly having a plurality of compression chambers therein, with each chamber having a valve assembly including disc-like valve bodies mounted on annular seats in the head over the associated compression chambers with the valve bodies containing typical spring biased pressure responsive disc valves for controlling the inflow and outflow of air relative to the compression chambers. The valve bodies are secured in the head by valve cages respectively associated therewith; the valve cages overlying and engaging the valve bodies and being secured to the head such as through threaded studs and nuts.

The first seal ring is located between the lower end face of the valve body and the associated annular valve seat formed in a recess in the head. The second seal ring has a lesser diameter than the first seal ring and is located concentrically relative to the first seal ring, on the upper face of the valve body between the latter end portions of the valve cage. The third seal ring is located in an annular recess in the periphery of the valve cage such that the seal ring engages a peripheral portion of a passage in the head containing the valve cage.

In accordance with the present invention, the second seal ring, which is located between the upper face of the valve body and the valve cage, is designed with a range of compression or deformation that is greater than that of the first seal ring, which is located between the lower face of the valve body and the seat in the head. This enables the first valve seal to be fully secured or compressed to its limit if desired by application of force through the valve cage to the valve body without causing the second seal ring to be fully compressed or deformed to or beyond its limit so that it will not cause distortion of the valve body. The second seal ring engages the valve body inwardly of the first seal ring at a position which, but for the present invention, could cause the valve body to be subjected to unwanted bending moments, causing detrimental distortion of the valve body. The present invention also enables the first and second seal rings to be designed to enable them to be quickly installed and compressed into proper sealing engagement with a degree of control but without requiring supervision or testing during installment. During installation of the seals the valve cage is forced on the valve body until the first seal ring is firmly or fully compressed into proper sealing engagement between the valve head and the valve body. At that point, and without any further calibration or testing, sufficient sealing forces will have been applied to the second seal ring to partially compress the same short of its limit of compression but sufficient to establish an effective seal on the upper face of the valve body.

It is preferred that the first and second seal rings be made from rings of asbestos and metal. Moreover, it is preferred that the first seal ring be made from copper and asbestos rings and the second from spirally wrapped bands of asbestos and stainless steel having a corrugated or serpentine cross section. The third seal ring may be a conventional rubber O ring.

DRAWINGS

Other objects and advantages of the present invention will become apparent from the following more detailed description taken in conjunction with the attached drawings in which.

DETAILED DESCRIPTION

Figure 1:
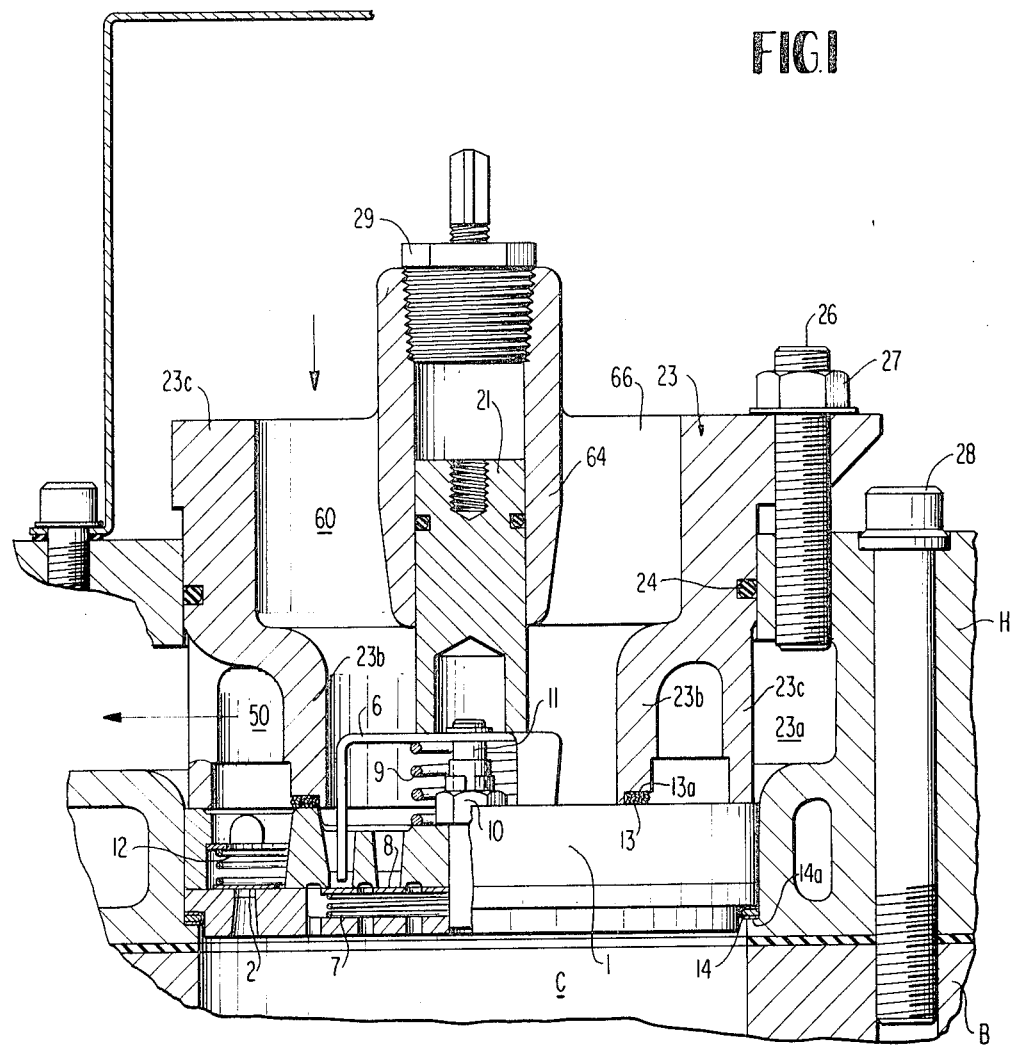
FIG. 1 is a cross-sectional view through an air compressor head showing a compression chamber and associated valve assembly and valve cage including seals in accordance with the present invention.

Referring to the drawings in detail, there is shown for illustrative purposes only an air compressor head assembly including a block having a compression chamber C and a head H secured on the block B through bolt and nut assemblies 28. Mounted in head H in an annular recess is a conventional valve assembly including a valve body 1 having an apertured plate or disc-like construction and including a conventional valve ring 2 and valve plate 8 which move in response to pressure against the bias of associated springs 12 and 7 in conventional and well known manner. Valve ring 2 controls air flow from compression chamber C to an air outlet passage 50, while valve plate 8 controls air flow from an inlet 60 to compression chamber C.

Valve body 1 is secured in place by means of a valve cage 23 having a novel configuration in accordance with the present invention and received in a generally cylindrical passage 23a in the head and secured therein by means of a nut and bolt assembly 26 and 27. An air operated unloading piston 21 is slideably mounted for reciprocation in the valve cage and contains an unloading finger 6 for purposes of unseating valve plate 8 for unloading the compressor in well known manner. Unloading finger 6 is mounted for sliding vertical movement on a stud 11 secured to the center of valve body 1 by a nut 10. Yieldingly biasing finger 6 upwardly is a coil compression spring 9 mounted about stud 11 with its opposite ends engaging finger 6 and valve body 1.

Valve cage 23 has a generally cylindrical body including an axial hollow hub 64 which receives unloader piston 21 and is closed at its top by a bushing 29 which confines piston 21. Bushing 29 has a passage therein for admitting air into and exiting air from the hub interior for controlling movement of unloader piston 21. Hub 64 is supported from the walls 23c of the cage 23 by radial webs 66, between which air inflow passage 60 extends. Webs 66 terminate generally at the center of the cage 23, below which air inlet passage 60 extends annularly around unloader piston 21. Valve cage 23 has recessed lower wall portions 23b which extend generally parallel to the outer wall 23c of the cage to define an air outflow passage 50 and to separate the latter from inflow passage 60.

The valve passages and air inflow and outflow passages 60 and 50 are sealed by a first seal ring 14 located in an annular recess or seat 14a formed in the head, as shown in FIG. 1. The second seal ring 13 has a lesser diameter than seal ring 14 and is located concentrically but inwardly relative to the first seal 14 on the upper face of the valve body to seal air inflow and outflow passages from each other. Seal ring 14 seals air from flowing from outflow passage 50 to compressor chamber C. The third seal ring 24, which may be a conventional rubber O ring, is placed in an annular passage in the outer periphery of valve cage 23 to engage against the walls 23a of passage 23 in the head which receives the valve cage, as shown clearly in FIG. 1. This prevents air from flowing from outflow passage 50 to atmosphere.

The sealing contact of seal rings 13 and 14 with the valve body 1 is effected through valve cage 23 upon advancement of the valve cage inwardly into valve head passage 23. Gradual advancement of the valve cage into the head passage to secure the valve body and to establish the proper sealing engagement relative to seal rings 13 and 14 is affected by gradual tightening of nuts 27.

Figure 2:
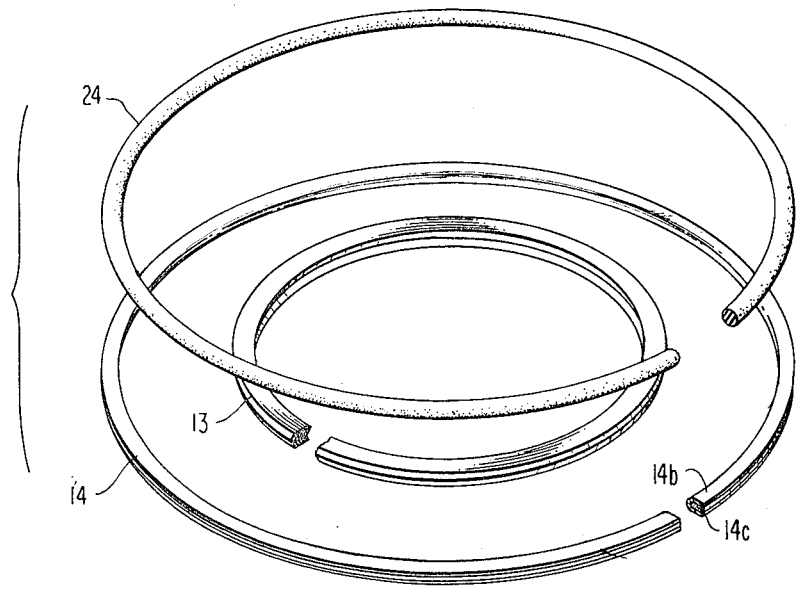
FIG. 2 is a perspective view of sealing rings included in the seal assembly and with portions broken away to show their cross section.

In accordance with the present invention the second seal 13 is designed to have a greater range of compression or deformation, or, in other words, a greater sealing range than the first seal ring 14. It is preferred that the second seal ring 13 have a metallic and asbestos construction, preferably alternately spirally wrapped bands of asbestos and stainless steel with each of the wrapped bands having a serrated or serpentine cross section, as shown in FIG. 2. Such a construction enables seal ring 13 to be subjected to a wide range of sealing forces and yet establish proper sealing contact with the object to be sealed. In one form of the invention, for example, the thickness of the seal may be 0.125 inches with an outside diameter of 2⅞ inches and inside diameter of 2⅛ inches. In this embodiment, the seal ring 13 would have an optimum range of compression from 0.110 inches to 0.090 inches in thickness.

In order to withstand excessive sealing forces, as well as pressures and temperatures encountered during operation of the compressor, it is preferred that the first seal 14 have a combination asbestos and metallic construction, for example, a U-shaped copper ring 14b with an asbestos ring 14c secured in the U-shaped channel of the copper ring, as shown in FIG. 2. In one commercial form of the invention, seal ring 14 may have a thickness of approximately one-sixteenth inch and outside diameter of approximately 4 inches and an inside diameter of approximately 3¾ inches. In this embodiment, seal ring 14 would have an optimum range of compression from 0.055 inch to 0.050 inch thickness.

In applying seal rings 13 and 14 during installation of the valve, seal ring 14 may be placed on its seat 14a in the head while seal ring 13 may be placed in an annular recess 13a formed in the ends of recessed internal wall portions 23b of the valve cage. O ring seal 24 is placed in its associated recess in the valve cage. The valve cage may then be installed axially in passage 23a of the valve head and gradually lowered or advanced in the valve head by advancing nuts 27 on studs 26. This, of course, will apply pressure to the valve body and ultimately to the lower or first seal ring 14, from which the forces will be transferred into valve head H and subsequently into block B.

In accordance with the invention, the valve cage 23 may be advanced until the lower seal ring 14 is firmly or fully compressed to provide tightly sealed joint at the lower face of the valve body. Despite the forces applied to the valve body to enable proper securement of the valve body and sealing contact of seal ring 14 with the valve body and the head, the upper seal 13 will not have been deformed or compressed to its limit. Thus, excessive sealing forces are not transferred to central portions of the valve body where they could impart unwanted bending moments and undesirable deformation or distortion of the valve body. At the same time, seal ring 13 will have been sufficiently compressed to establish a sufficient seal at the upper face of the valve body. Moreover, seal rings 13 and 14 may be designed so that upon application, when seal ring 14 is fully compressed, seal ring 13 will have automatically been compressed into proper sealing contact with the valve body, thereby avoiding any necessity of further testing to insure that too little or too great sealing forces have been applied to seal ring 13.

From the above description it will be seen that the present invention also provides a novel valve cage permitting three seals to be installed simultaneously in one easy maneuver requiring little or no skill. The valve cage also provides a compact air flow passage arrangement reducing the number of seals and parts required, as well as facilitating the flow of air through the compressor.

I claim:

1. In an air compressor including a casing having an air compression chamber, a main passage communicating with said compression chamber, and a valve means in said passage for controlling flow of air from said passage into said compression chamber and from said compression chamber to an air outlet, said valve means including a rigid casing member and further having an air inlet passage and an air outlet passage concentric with said air inlet passage; a seal assembly including a valve cage holding said valve seated in said casing, said cage having a central air passage communicating with said air inlet passage of said valve means, said valve cage having an air outlet passage communicating with said air outlet passage of said valve means, a deformable seal ring located between said valve means and said valve cage and sealing said air inlet and outlet passages from each other, said seal ring being held in place by rigid portions of said valve cage while acting to resiliently transmit pressure to said casing member, said main passage in said casing having an annular seat receiving said valve means, and wherein there is further included a second deformable seal ring between said valve means and said seat, said valve cage having outer rigid portions applying pressure to and through said casing member to establish firm sealing engagement of said second defined seal ring between said valve means and said seat said first seal ring having a greater range of compression and being capable of undergoing greater compressive deformation than said second defined seal ring such that when said second seal ring is compressed into firm engagement with said seat, said first seal ring will not have undergone full compression but will have established sealing contact with said valve means without transfer of excessive sealing forces to said valve means preventing distortion of said valve means.

2. The combination defined in claim 1 wherein said first seal ring has a range of compression such that it may be compressed from a thickness of 0.110 inches to 0.090 inches.

3. The combination defined in claim 1 wherein said second seal ring has a range of compression such that it may be compressed from a thickness of 0.055 inches to 0.050 inches.

4. The combination defined in claim 1 wherein each of said seal rings are made from rings of asbestos and metallic material having a generally serpentine cross section.

5. The combination defined in claim 4 wherein the metallic material of said first seal ring is stainless steel and the metallic material of said second seal ring is copper.

6. In an air compressor including a casing having an air compression chamber, a main passage communicating with said compression chamber, and a valve means in said passage for controlling flow of air from said passage into said compression chamber and from said compression chamber to an air outlet, said valve means including a rigid casing member and further having an air inlet passage and an air outlet passage concentric with said air inlet passage; a seal assembly including a valve cage received in said main passage and holding said valve seated in said casing, said cage having a central air passage communicating with said air inlet passage of said valve means, said valve cage having an air outlet passage communicating with said air outlet passage of said valve means, a deformable seal ring located between said valve means and said valve cage and sealing said air inlet and outlet passages from each other, said seal ring being held in place by rigid portions of said valve cage while acting to resiliently transmit pressure to said casing member, said portions of said cage extend axially of said cage but are spaced inwardly from the periphery of said cage and separate said air inflow and outflow passages of said valve cage, said main passage in said casing having an annular shoulder defining a valve seat receiving said valve means, and wherein there is further included a deformable seal ring between said valve means and said valve seat, said valve cage having outer rigid portions applying pressure to and through said casing member to establish firm sealing engagement of said second defined seal ring between said valve means and said seat said first defined seal ring having a greater range of compression and being capable of undergoing greater compressive deformation than said second defined seal ring such that when said second defined seal ring is compressed into firm engagement with said seat said first seal ring will not have undergone full compression but will have established sealing contact with said valve means without transfer of excessive sealing forces to said valve means preventing distortion of said valve means.

7. The combination defined in claim 6 wherein said valve cage has an annular recess in the external surface thereof including a flexible and resilient O-ring in said annular recess sealingly engaging said main passage of said casing.

8. The combination defined in claim 7 wherein said portions of said valve cage have an annular recess receiving said first seal ring.

* * * * *

UNITED STATES PATENT OFFICE
CERTIFICATE OF CORRECTION

Patent No. 3,814,546　　　　　　　Dated　June 4, 1974

Inventor(s)　Richard Ostwald

It is certified that error appears in the above-identified patent and that said Letters Patent are hereby corrected as shown below:

Claim 1, line 24, after "seat" insert a comma -- , --;

line 28, change "scat" to -- seat --.

Signed and sealed this 15th day of October 1974.

(SEAL)
Attest:

McCOY M. GIBSON JR.　　　　　　　　C. MARSHALL DANN
Attesting Officer　　　　　　　　　Commissioner of Patents